(12) United States Patent
Furrer et al.

(10) Patent No.: US 9,024,194 B2
(45) Date of Patent: May 5, 2015

(54) SECTION INSULATOR

(75) Inventors: Beat Furrer, Bern (CH); Felix Nünlist, Herrenschwanden (CH); Daniele Apicella, Rome (IT)

(73) Assignee: Furrer+ Frey AG, Bern (CH)

( * ) Notice: Subject to any disclaimer, the term of this patent is extended or adjusted under 35 U.S.C. 154(b) by 190 days.

(21) Appl. No.: 13/885,722

(22) PCT Filed: Oct. 6, 2011

(86) PCT No.: PCT/EP2011/004980
§ 371 (c)(1),
(2), (4) Date: Jun. 25, 2013

(87) PCT Pub. No.: WO2012/065663
PCT Pub. Date: May 24, 2012

(65) Prior Publication Data
US 2014/0144672 A1    May 29, 2014

(30) Foreign Application Priority Data
Nov. 16, 2010    (DE) .......................... 10 2010 051 379

(51) Int. Cl.
*H01B 17/02* (2006.01)
*B60M 1/18* (2006.01)

(52) U.S. Cl.
CPC . *H01B 17/02* (2013.01); *B60M 1/18* (2013.01)

(58) Field of Classification Search
USPC .......... 174/70 B, 88 B, 99 B, 138 R; 439/210
See application file for complete search history.

(56) References Cited

U.S. PATENT DOCUMENTS

| 5,760,339 | A | * | 6/1998 | Faulkner et al. | ............ 174/88 B |
| 5,854,445 | A | * | 12/1998 | Graham et al. | ............ 174/99 B |
| 6,206,156 | B1 | | 3/2001 | Nunlist | |

FOREIGN PATENT DOCUMENTS

| CA | 1116707 A1 | 1/1982 |
| DE | 1163894 B | 2/1964 |
| DE | 2837370 A1 | 3/1979 |
| EP | 0052176 B1 | 3/1985 |
| EP | 0592819 B1 | 11/1996 |
| FR | 2140934 A5 | 1/1973 |
| GB | 912211 A | 12/1962 |
| JP | 60234034 A | 11/1985 |
| WO | 99/03700 A1 | 1/1999 |

OTHER PUBLICATIONS

International Search Report, PCT/EP2011/004980, dated Feb. 6, 2013, 3 pages.
Abstract of JP60234034; Nov. 20, 1985.

* cited by examiner

*Primary Examiner* — Dhirubhai R Patel
(74) *Attorney, Agent, or Firm* — Senniger Powers LLP

(57) ABSTRACT

A section insulator for two aligned rigid conductor rails, wherein the section insulator forms a closed system in that, in the extension of each conductor rail, a conductive runner and an insulating runner rigidly connected to the conductive runner are connected to the opposing conductor rail. The lower side of the runners, facing the travel plane, is arranged in a contact plane. All of the runners are also height-adjustable in relation to the conductor rails.

14 Claims, 9 Drawing Sheets

Fig. 8 (View D)

Fig. 9 (View F)

SECTION INSULATOR

REFERENCE TO RELATED APPLICATIONS

This application is a PCT national stage application based PCT/EP 2011/004980 filed Oct. 6, 2011 and claims priority to German application 10 2010 051 379.2 filed Nov. 16, 2010, the entire disclosures of which are incorporated by reference.

FIELD OF THE INVENTION

The invention relates to a section insulator of the type for two aligned rigid conductor rails having opposing ends which protrude into a space separating the two rails and connected with first and/or second conductive runners protruding into the space, with the two runners overlapping longitudinally and being antiparallel to each other.

BACKGROUND OF THE APPLICATION

A section insulator of this general type is known from WO 99/03700. Two aligned rigid conductor rails are shown there, the facing ends of which have a first space between each other. An electroconductive runner each is connected to these ends, with the two runners projecting into the first space, substantially running antiparallel (i.e., parallel but pointing in opposite directions) to each other in a second space/distance, with said second space/distance being selected such that at operating voltage of the conductor rails a safe electrical isolation is guaranteed which also means that no spark discharges between the runners can occur. The electroconductive runners and the adjacent conductor rails at least with their lower side facing the travel plane are arranged in a plane called contact plane. In relation to the running direction, i.e. the conductor rail longitudinal axis, the two electroconductive runners intersect, so that the collector of a vehicle when passing the section insulator is always in electrical contact with at least one of the runners and contacts it.

The known runners run inclined relative to the conductor rail longitudinal axes and have a free unsecured end each facing the opposing conductor rail. Insofar it is an open system. Moreover, the free ends of the electroconductive runners are each bent towards the top and away from the travel plane in order to achieve a gentle entry of the collector of a vehicle and to avoid a "threading" of the collector or a shock when reaching the free end of the runner.

In the area of the two antiparallel runners, however, there is the problem that on the hand due to the bent up free ends of the runners and on the other hand by not exact assembly only one runner of the collector is contacted. In the only small air gap between the runner not contacted but under voltage, an electric field is formed which is the greater, the smaller the air gap is. As a result of the great field strength in this area, a spark discharge may occur. But any spark discharge is undesired, since it causes successive burn-up and wear on the contact wire and on the collector and produces inductive voltage peaks which might damage the electric motor of the vehicle. If both runners are contacted, this occurs due to the inexactness mentioned with contact forces of different amounts, whereby contact resistances of different amounts and highly fluctuating in practice occur on both contact points between contact wire and collector which is undesired. Moreover, the runners, due to their free ends, on contact with the collector can be induced to mechanical vibrations also perpendicular to the travel plane leading again to air gaps as well as different contact forces. Above all, the very elastically carried contact strips on the collector are induced to mechanical vibrations.

Moreover, it may also happen that the point of contact between the runner and the collector "jumps" several times between the runner and the collector, causing each time an impulse to occur on the collector. This impulse is the greater, the greater the travelling speed is. Due to the large second distance necessary for electrical isolation between the two runners, the impulses are applied on the contact strip of the collector relative eccentrically, whereby the impulses occurring cause undesired torque impulses on the collector which is correspondingly strongly deflected.

EP 0 052 176 B1 shows a section insulator for contact wires attached on chain supporting structures, the opposing ends of which are spaced apart from each other. Both ends of the contact wires are connected with each other via parallel insulating strips which are contacted by the collector of a vehicle passing by. On the ends of the two contact wires a spark conductor is attached. In the transition area between the two contact wires the contact strip of the vehicle contacts only the insulating strips so that the vehicle has no power supply. Due to the inductance of the electric motors of the vehicle, high voltage peaks can occur. This is why the spark conductors are provided. Nevertheless, spark formation is undesired for the reasons mentioned above.

EP 0 592 819 B1 shows a section insulator for contact wires attached to catenary structures, the opposing ends of which are connected with each other by electrically insulated runners. On both ends of the contact wires arcing horns with runner ramps are attached which protrude into a first space between the two contact wires and have a second space/distance between each other. To one of the two arcing horns, electroconductive runners are connected, running parallel to the insulating runners and extending so far in the direction of the opposing arcing horn that the sectioning point between the two conductive runners is sufficiently bridged. The lower sides of the runner leads, the insulating runners and the conductive runners facing the travel plane shall be arranged precisely in one plane there and preferably be formed flat themselves. In addition, the two insulating runners shall still have an arc preventing means so that in total seven elements, namely two conductive runners, two insulating runners, two arc preventing means and one runner lead shall be contacted by the collector. It is difficult, however, to align seven elements precisely in one plane. Also, by different wear, such as for example abrasion or burn-up, the individual elements can be worn out unequal so that again air gaps and thus spark formation occurs between the contact strip and the electroconductive runners.

JP 60234034 A shows a section insulator for contact wires attached to catenary supporting structures, the ends of which in the area of the section insulator are deflected laterally opposed and run antiparallel and spaced apart from each other. The free ends of the contact wires are connected to the other contact wire in each case via an insulator. Moreover, the contact wires in the area of the section insulator are bent off from the travel plane towards the top so that they cross in side view. The contact strip of a vehicle passing by must follow the change in height, if a constant contact with the contact wire is to be maintained which is impossible at higher speeds. Hence, the problems described in the beginning occur as well.

SUMMARY OF THE INVENTION

It is the object of the present invention to improve the section insulator of the type mentioned above such that it guarantees a constant contact between a collector and a contact wire in rigid conductor rails, and the problems of spark formation are avoided. This includes all problems mentioned above which might lead to a spark formation.

This object is solved by the features mentioned in claim 1. Advantageous embodiments and further embodiments of the invention can be taken from the dependent claims.

The basic idea of the invention is that the section insulator arranges closed runners in one plane which intersect each other so that the slide runner of a collector is always in contact with a conductive runner under voltage, with each conductive runner being connected with the opposing conductor rail via an insulating runner. The conductive runners have an insulating spacing to each other. The contact strip of the collector when passing the entire section insulator is always in contact with two runners arranged in one plane since the contact strips are symmetrically directed over the section insulator. By the mechanically closed system, vibrations are largely eliminated which eliminates also the risk of spark formation.

BRIEF DESCRIPTION OF THE FIGURES

The invention is explained in more detail below by means of an embodiment in connection with the drawing where.

DETAILED DESCRIPTION OF PREFERRED EMBODIMENTS

Figure 1:
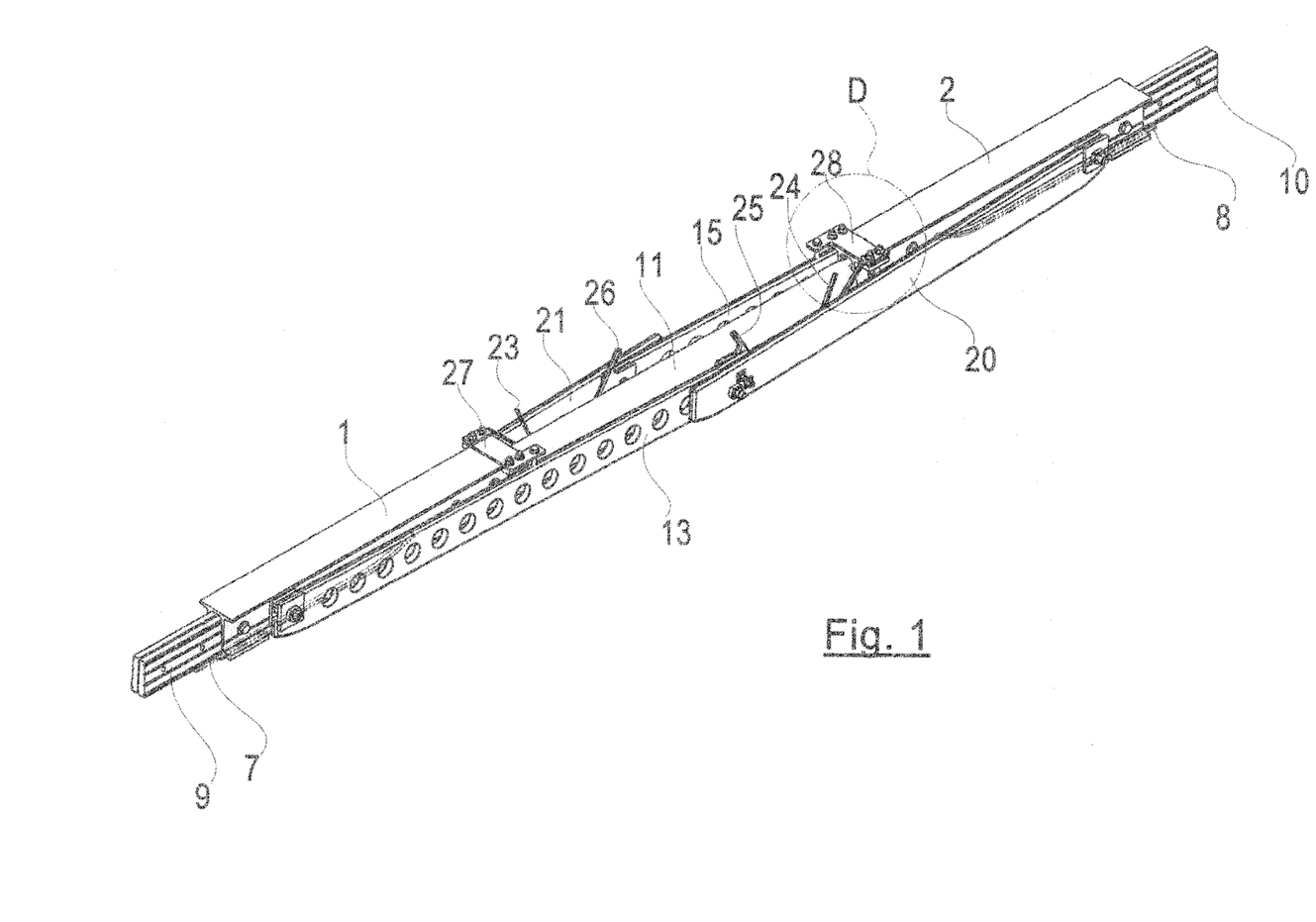
FIG. 1 is a perspective view of a section insulator according to the invention seen diagonally from above.
Figure 2:
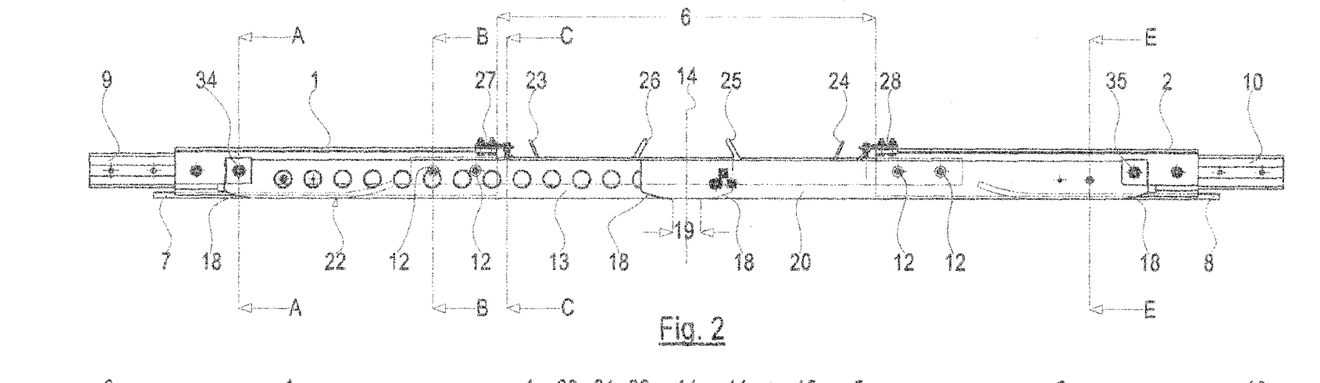
FIG. 2 is a side view of the section insulator according to the invention.
Figure 3:
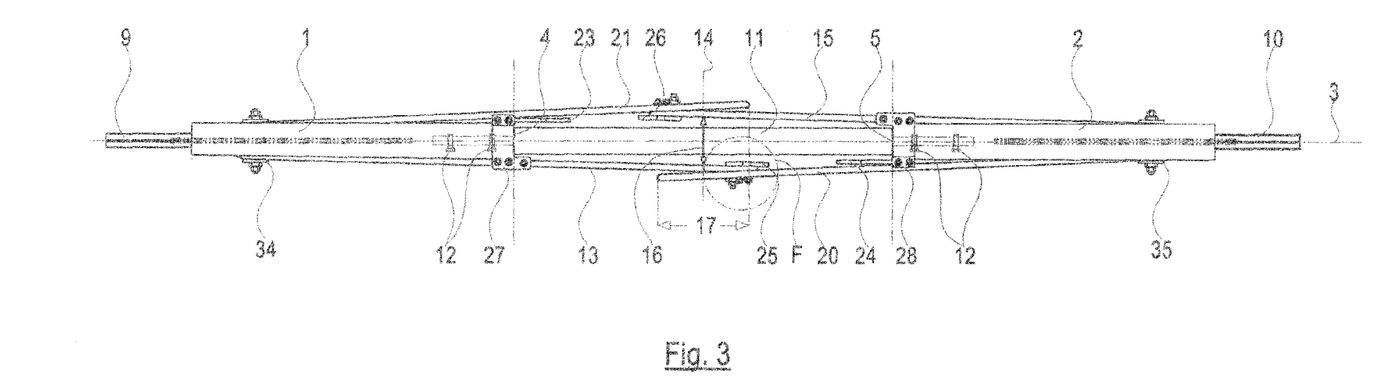
FIG. 3 is a top view of the section insulator of FIG. 2.

At first, reference is made to FIGS. 1 to 3.

The section insulator has a first conductor rail 1 and a second conductor rail 2, which are aligned towards each other along a travel line 3, and the ends 4 and/or 5 of which have a first space 6 in the direction of the travel line 3. Both conductor rails 1 and 2 hold a contact wire 7 and/or 8 each, which extends from the respective section only up to approximately the middle area of the respective conductor rail 1 or 2, and the end of which is bent open towards the top away from the travel plane.

The other ends of the conductor rails 1 and 2 facing the respective section can be connected with other conductor rails via butt straps 9 and 10 of the known type (cf. DE 20 2004 009 420 U1) holding the contact wires 7 and 8.

Both conductor rails 2 are mechanically connected with each other via an insulating rod 11, which extends along the travel line 3, with the two ends of the insulating rod being introduced into the section of the respective conductor rail 1 and/or 2 and secured there by screws 12.

On one side of the first conductor rail 1 a conductive runner 13 made from conductive material, such as for example copper, is attached which extends into the first space 6 and projects beyond the center 14 of the section insulator towards the second conductor rail 2. Similarly, on the opposite side of the second conductor rail 2 a second conductive runner 15 is attached, which similarly projects into the space 6 and extends beyond the center 14 of the section insulator towards the opposing first conductor rail. The two conductive runners 13 and 15 are bent open facing away from the conductor rail so that in the center 14 they have a second space/distance 16 measured transversely to the travel line 3 which depending on the operating voltage must be sufficiently large that no voltage flashover can occur taking into account breakdown voltage of air also in unfavorable climate conditions.

It is evident to the person skilled in the art that dimensioning of the space 6 and distance 16 depends on the respective operating voltage. Therefore, the proportions shown in the drawing are only a possible example and have to be adjusted to the contact wire voltages which have, for example, 600 to 3000 V direct voltage or 1100 to 35000 V alternating voltage. The section insulator according to the invention can of course be used for all possible voltages.

In the side view of FIG. 2, the two conductive runners 13 and 14 intersect in a first overlapping area 17. Moreover, the lower sides of the two conductive runners 13 and 14 facing the travel plane on their ends are provided with a ramp and/or lead rounding 18 so that a shorter actual second overlapping area 19 results.

The end of the first conductive runner 13 facing the second conductor rail 2 is connected with a first insulating runner 20, the other end of which is connected with the second conductor rail 2, with the first insulating runner 20 being also bent open vis-à-vis the travel line 3 and/or running diagonally.

Similarly, the end of the second conductive runner 15 facing the first conductor rail 1 is connected with the first conductor rail 1 via a second insulating runner 21. The ends of the insulating runners 20 and 21 each connected with the assigned conductive runner 13 and/or 15 likewise have ramp and/or lead roundings 18.

The two conductive runners 13 and 15 and the two insulating runners 20 and 21 vis-à-vis the two conductor rails 1 and 2 are aligned such that their lower side facing the travel plane and thus the contact runner of a collector of a vehicle is arranged in a common plane to the contact wires 7 and 8, with it being intended that said plane is located in parallel to the travel plane. Said plane is called contact plane 22 in the following.

The two conductive runners 13 and 15 and the two insulating runners 20 and 21 are height-adjustable by eccentric bushings so that their lower sides can be aligned exactly with the contact plane 22 determined by the contact wires 7 and 8. Thus, transition of the contact runner of the vehicle from the respective contact wire 7, 8 to the conductive runners 13, 15 and the insulating runners 20, 21 occurs gently and without any impulses so that no vibrations are induced either and hence also spark formation is minimized.

For discharge of any sparks still four spark conductors 23 to 26 are provided. A first spark conductor 23 is attacked on the end 4 of the first conductor rail on the side opposing the first conductive runner 13. Similarly, a second spark conductor 24 is attached on the end 5 of the second conductor rail 2 opposing the second conductive runner 15. A third spark conductor 25 is attached on the end of the conductive runner 13 which is connected with the first insulating runner 20. The fourth spark conductor 26 is finally attached on the end of the second conductive runner 15 which is connected with the second insulating runner 21.

Figure 6:
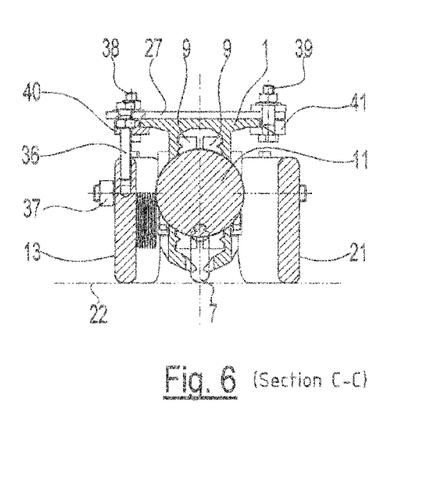
FIG. 6 is a section along line C-C of FIG. 2.

Furthermore, a connection plate 27 and 28 each is provided for height adjustment and for lateral spreading of the conductive runners 13 and 15, which on the one hand is attached close to the end 4, 5 of the respective conductor rail 1, 2, and as is described more in detail in connection with FIG. 6, engages in the conductive runner 13, 15 with a screw, whereby the height of the conductive runner can be adjusted.

Figure 4:
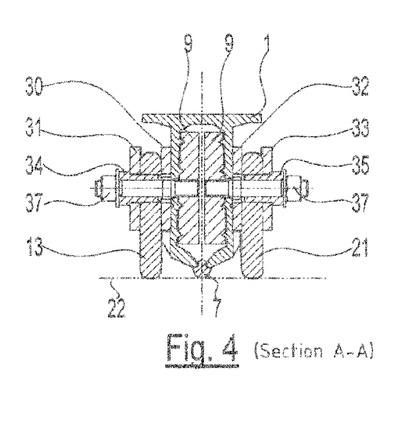
FIG. 4 is a section along line A-A of FIG. 2.

FIG. 4 shows a cross-section along line A-A of FIG. 2 where the location is shown where the first conductive runner 13 and the second insulating runner 21 are attached on the section-side end of the first conductor rail 1. The first conductor rail 1 in this area still has the two butt plates 9 for connection with other conductor rails of the section. On an exterior side of the conductor rail 1 the first conductive runner 13 is held between two connection plates 30 and 31 and on the opposite side the second insulating runner 21 is held between two connection plates 32 and 33, with both runners 13 and 21 being supported on eccentric bushings 34 and 35 which are held by screws. The two screws 37 penetrate the eccentric sleeves 34 and/or 35 and the two inner connection plates 30 and/or 32 as well as the two side walls of the conductor rail 1, and are screwed into threaded holes of the butt straps 9.

By rotating the eccentric bushings 34 and 35 by means of a tool, such as for example a wrench, the height of the conductive runner 13 and the insulating runner 21 is infinitely variable so that in particular the lower side of the conductive runner 13 and the insulating runner 21 are arranged precisely in the contact plane 22. Also, in the case of possible wear of the runners or the contact wire 7, readjustment is easily possible by it.

For improved and definite fixation, projections and adjusted recesses are provided between the butt plates 9 and the side walls of the conductor rail 1 so that the butt plates are also held in a positive-locking manner in the conductor rail section, and are thus clearly positioned.

Figure 5:
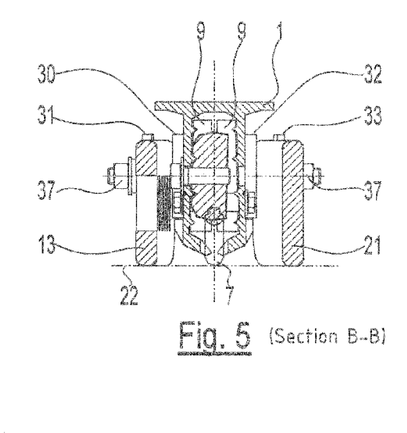
FIG. 5 is a section along line B-B of FIG. 2.

FIG. 5 shows a cross-section along line B-B of FIG. 2, i.e. in the location where the insulating rod 11 is connected with the first conductor rail 1.

The insulating rod 11 is on both ends, which are inserted into the conductor rails 1 and 2, substantially rectangular, and is fixed to one of the side walls of the conductor rail 1 by means of screws 12. Similarly to the butt plates 9, also the ends of the insulating rod 11 have an additional positive connection with the conductor rail by projections and adjusted recesses. Not only the first conductive runner 13 but also the second insulating runner 21 are here already held in a distance to the exterior sides of the conductor rail 1 and/or 2.

Moreover, it can be seen in FIG. 5 that the contact wire 7 is bent open from the contact plane 22 towards the top since in this area of the section insulator only the conductive runner 13 provides the power supply.

FIG. 6 shows a section along line C-C of FIG. 2, i.e. the location of the connection plate 27. The insulating rod 11 has a circular cross-section here. The insulating plate 27 rests on the upper side of the conductor rail 1 and is fixed on the conductor rail 1 by means of screws 38 and 39 and clamping elements 40 and 41 overlapping the lateral edges of the conductor rail 1. Another screw 36 on the connection plate 27 is screwed into a threaded hole of the first conductive runner 13. Via said screw 36 the height of the first conductive runner 13 relative to the first conductor rail 1 can be adjusted. Thus, via the eccentric sleeve 34 (FIG. 4) and the screw 36 (FIG. 6), the position of the first conductive runner 13 can be precisely adjusted. Similarly, this applies of course also to the second conductive runner 15 in connection with the connection plate 28 and a corresponding screw.

Figure 7:
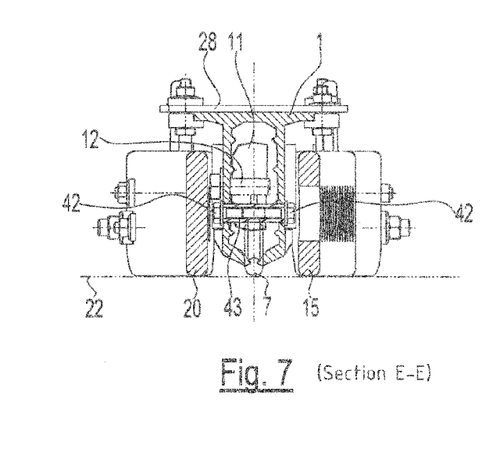
FIG. 7 is a section along line E-E of FIG. 2.

FIG. 7 shows a section along line E-E of FIG. 2, i.e. a location which is arranged between the butt strap 10 and the insulating rod 11. In this location, the two clamping arms of the conductor rail 2 are pushed apart by a distance sleeve 43 with screw 42 in order to be able to insert the contact wire 7. Later, said distance sleeve 43 is removed. The conductor rail has corresponding holes for passage of the screws 42, with the screw heads being supported on perforated disks which rest on the exterior side of the side walls of the conductor rail 2.

Figure 8:
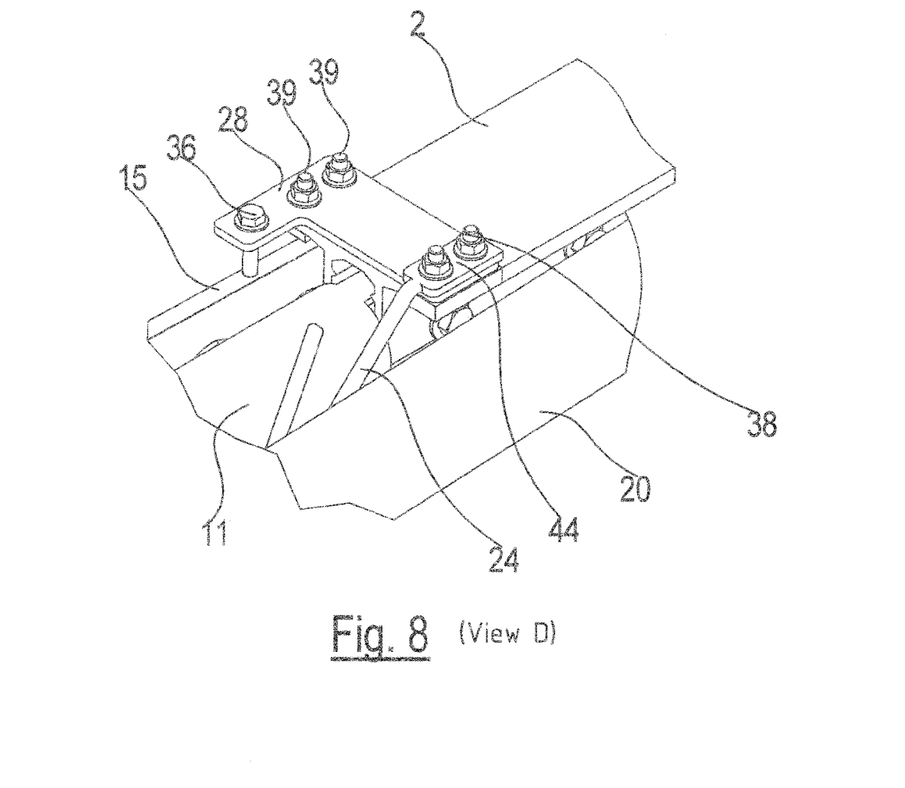
FIG. 8 is an enlarged view of detail D of FIG. 1.

FIG. 8 shows a perspective enlarged view of detail D of FIG. 1, i.e. on the connection plate 28 with the spark conductor 24. The spark conductor 24 is formed as a bent round bar on one end of which a flat plate 44 is attached in a single piece which is fixed to the connection plate 28 with screws 38. Moreover, the screw 36 for height adjustment of the conductive runner 15 can be seen even better.

Figure 9:
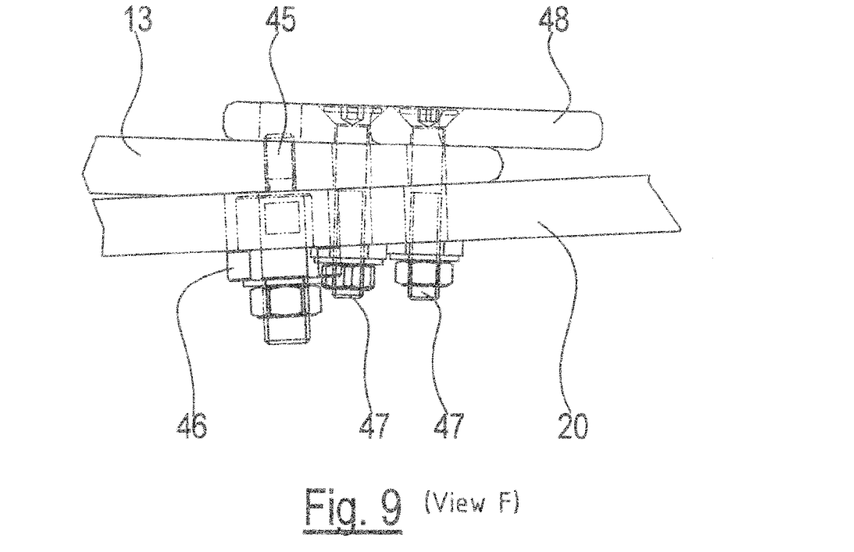
FIG. 9 is an enlarged view of detail F of FIG. 3.

FIG. 9 shows an enlarged illustration of detail F of FIG. 3, i.e. the connection between the conductive runner 13 and the insulating runner 20. It must be possible to adjust the height of these two runners relative to each other as well so that all parts are arranged exactly in the contact plane. The position of the conductive runner 13 is precisely positioned by the eccentric sleeve 34 and the screw 36 so that finally only the position of the insulating runner 20 must still be adjusted. For this, the two runners 13 and 20 have a bore in the connection area into which a pin 45 is inserted. The insulating runner 20 mounted outside has a larger bore into which an eccentric sleeve 46 is inserted which overlaps the pin 45. By rotating the eccentric sleeve 46, the height of the insulating runner 20 vis-à-vis the conductive runner 13 can be adjusted. Said adjusted position can be fixed by two screwings 47 which penetrate through the two runners 20 and 13, and are supported on plate 48 of the spark conductor 25.

Figures 10, 11:
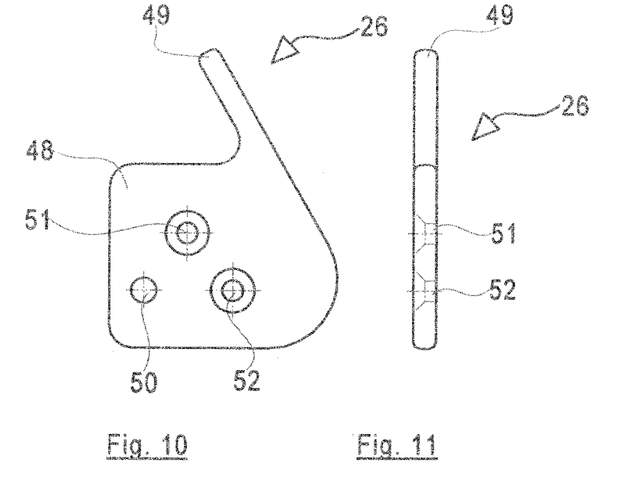
FIG. 10 is a side view of a first spark conductor used in the invention.
FIG. 11 is a front view of the spark conductor of FIG. 10.

FIGS. 10 and 11 show a side view and a front view of the spark conductors 25 and 26 which are attached on the connection point between the respective conductive runner and the insulating runner. They comprise the flat plate 48 from which a spark conductor tip 49 projects. The plate 48 has three bores 50, 51 and 52. The bore 50 serves for receiving the pin 45 (FIG. 9) whereas the bores 51 and 52 are countersunk head bores which receive the screwings 47 (FIG. 9).

Figure 12:
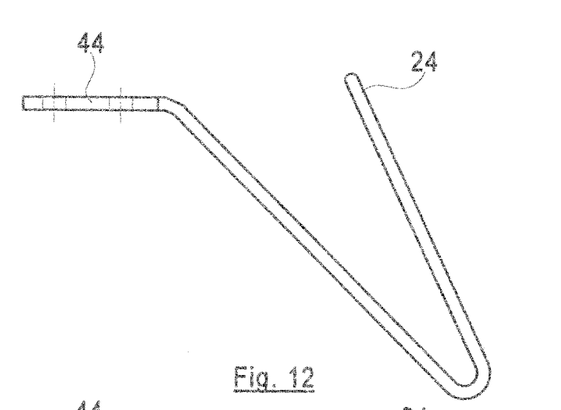
FIG. 12 is a side view of a second spark conductor used in the invention.
Figure 13:
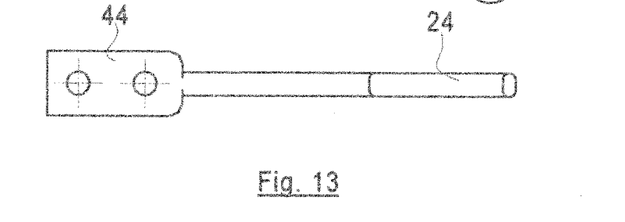
FIG. 13 is a top view of the spark conductor of FIG. 12.

FIGS. 12 and 13 show a side view and a top view of the spark conductors 23 and 24 which are each attached on the ends of the conductor rail 1 and 2. They have a V-shaped spark discharge tip which is connected in one single piece with the flat plate 44 with which the spark conductor is fixed to the connection plates 27 and/or 28 (FIG. 8) via the screws 38.

Figure 14:
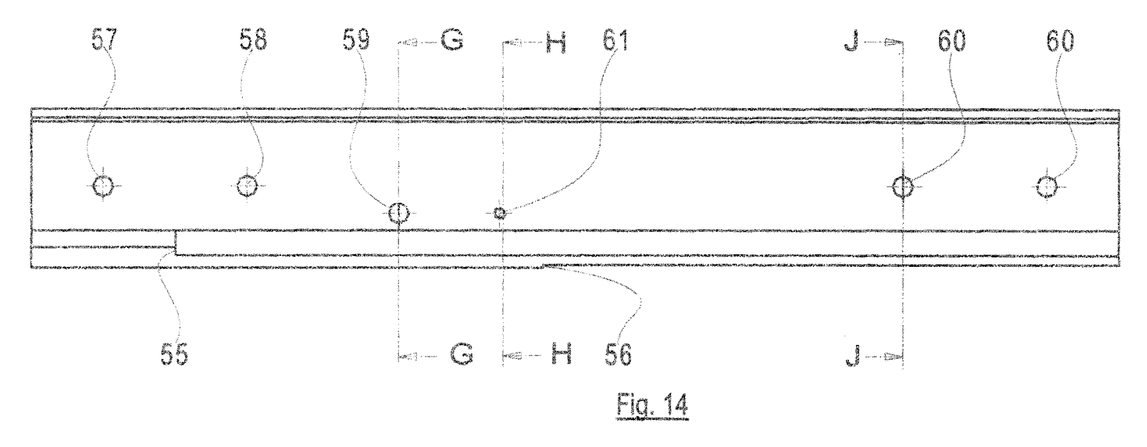
FIG. 14 is a side view of the conductor rails used for the section insulator; or other conductor rails.
Figure 15:
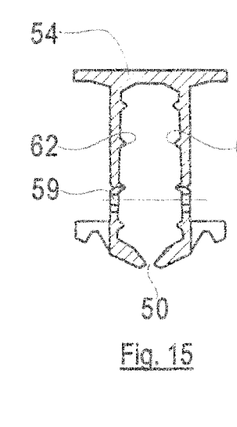
FIG. 15 is a section along line G-G of FIG. 14.
Figure 16:
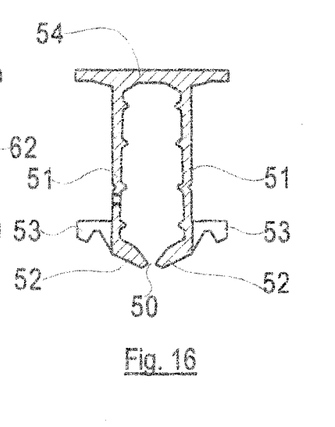
FIG. 16 is a section along line H-H of FIG. 14.
Figure 17:
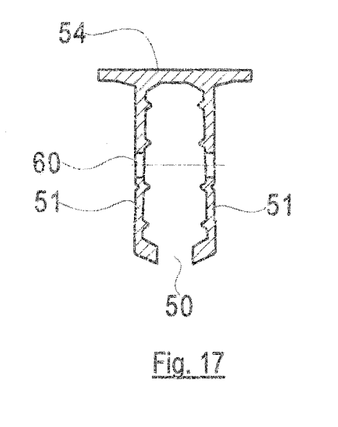
FIG. 17 is a section along line J-J of FIG. 14.

FIGS. 14 to 17 show the first conductor rail 1. FIG. 14 is a side view. FIGS. 15, 16 and 17 are cross-sections along lines G-G, H-H and/or J-J.

Generally, a conventional streamlined section is used which is, however, worked for the section insulator. The conventional rail section is a single section which can be produced from aluminium or an aluminium alloy in a pultrusion process. In total, it forms a largely closed box section, interrupted only by a longitudinal slot 50 for receiving the contact wire 7, which holds the contact wire by clamping arms 51 and gripping arms 52. On the transition area between the clamping arms 51 and the gripping arms 52 lateral cantilever arms 53 are mounted. The opposing ends of the clamping arms 51 are connected to a crossbar.

For use on the section insulator according to the invention, the cantilever arms 53 extend only up to a location 55 from the section-side end of the conductor rail, and are removed from there up to the other end so that the conductive runners and the insulating runners can be fixed to the exterior sides of the clamping arms 51 and protrude up to the contact plane.

As is shown in FIG. 2, the contact wire 7 is only clamped over an area of the conductor rail 1, and bent towards the top further on. In order that the contact wire can be placed accordingly, the gripping arms 52 are partly cut off as from location 56, as can be seen in the sectional view J-J of FIG. 17, with the remainder of the gripping arms not protruding any more to the contact plane 22 for it.

In the side view of FIG. 14 different bores can be seen. The bore 57 serves for the fastening screw of the butt plate 9. The bore 58 serves for connection of the eccentric sleeve 34. The bore 59 serves for the threaded sleeve 43 and the screws 42 (FIG. 7) for clamping and adjusting the clamping arms. The bores 60 serve for attaching the screws 12 by means of which the insulating rod 11 is fixed to the conductor rail.

The bore 61 is a threaded hole which is only mounted on one of the clamping arms 51. A screw is screwed into this threaded hole when inserting the contact wire which spreads the two clamping arms apart because the contact wire insertion trolley can open the conductor rail due to the lacking cantilever arms 53 only up to location 55. When a screw is screwed into the threaded hole 61, it supports on the opposing clamping arm and thus opens the section for the contact wire insertion. Subsequently, the screw is removed.

Furthermore, one can still see in FIGS. 15 to 17 that the clamping arms comprise several projections 62 pro-truding inside which extend over the entire section length. They serve for positive connection with the butt plates 9 and the ends of the insulating rod 11 which each have matching grooves.

The description of the conductor rail 1 applies similarly to the second conductor rail 2 which is arranged mirror-symmetrically to the center line 14 (FIGS. 2 and 3).

Furthermore, it is should be noted that the distance sleeve 43 and the screwing 42 serve to ensure safety and prevent an undesired "dropping" of the contact wire.

Figure 18:
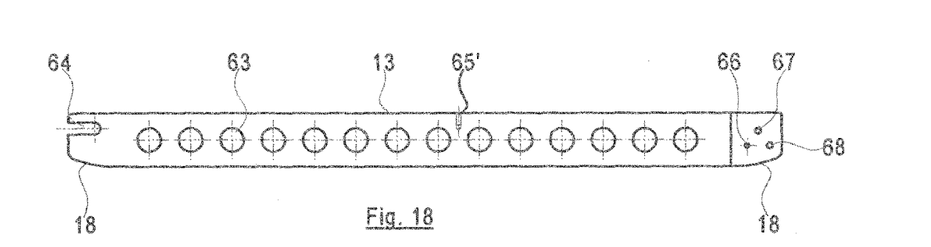
FIG. 18 is a side view of a conductive runner of the section insulator.
Figure 19:
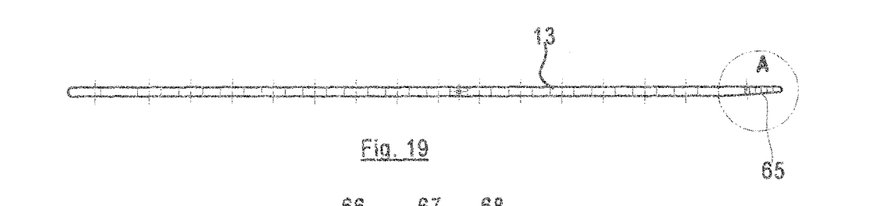
FIG. 19 is a top view of the conductive runner of FIG. 18.
Figure 20:
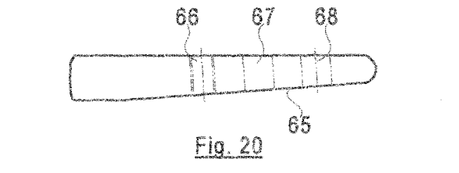
FIG. 20 is an enlarged view of detail A of FIG. 19.

FIGS. 18 and 19 show the conductive runner 13 in side and top view. FIG. 20 shows an enlarged cutout A of FIG. 19 at the end of the conductive runner. The conductive runner 13 is an elongated, substantially rectilinear, flat body with good electrical conductivity, such as copper, for example. Its edge forms a contact edge which is arranged in the contact plane 22. The contact edge is provided with ramp and/or lead roundings 18 on both ends. Along the entire body a plurality of openings 63 is provided, which are arranged equally spaced apart along a straight line, and serve for material and weight saving, and to obtain access to screws on the conductor rail and/or the insulating rod in some locations.

At one end, the conductive runner comprises an oblong hole opening 64 for receiving the eccentric sleeve 34. At the other end, the conductive runner, as is shown in detail A, is provided with a chamfer 65 comprising three bores 66, 67 and 68 for receiving the pin 45 (FIG. 9) and the screwings 47 (FIG. 9). The chamfer 65, as is also shown in FIG. 9, is formed such that the conductive runner 13 and the insulating runner 20 come into contact planely, although they are, as shown in FIG. 2, spread vis-à-vis the longitudinal axis 3.

Figure 21:
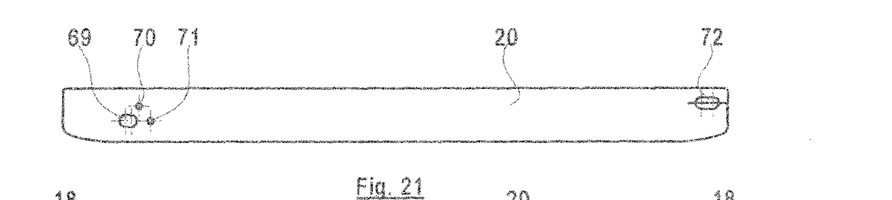
FIG. 21 is a side view of an insulating runner of the section insulator.
Figure 22:
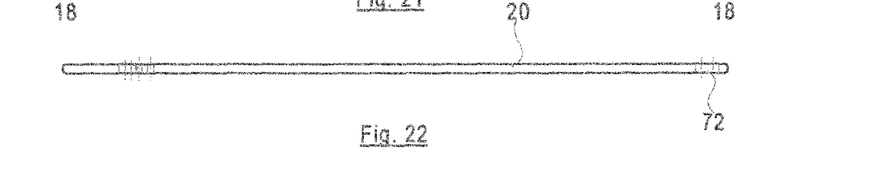
FIG. 22 is a top view of the section insulator of FIG. 21.

FIGS. 21 and 22 show the insulating runner 20 in side and top view. A bottom edge of the insulating runner is likewise arranged in the contact plane 22. Also the insulating runner in the area of both ends is provided with a ramp and/or lead rounding 18. In the area of the one end, which is connected with the conductive runner 13, three openings 69, 70 and 71 are provided, which align with openings 66, 67 and 68, with the opening 69 being formed as an oblong hole for receiving the eccentric sleeve 46. At the other end, the insulating runner 20 comprises also an oblong hole 72 for receiving the eccentric sleeve 35.

As can be seen from FIG. 2, however, the conductive runner 13 and the insulating runner 20 overlap outside the center line 14 so that one of the two runners, here the insulating runner 20, is shorter than the assigned conductive runner.

Figure 23:
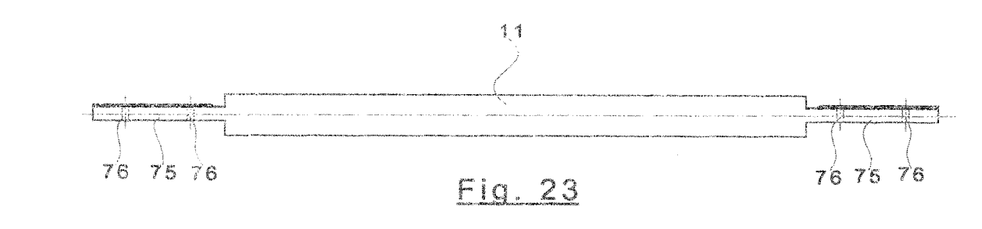
FIG. 23 is a top view of an insulating rod of the section insulator.
Figure 24:
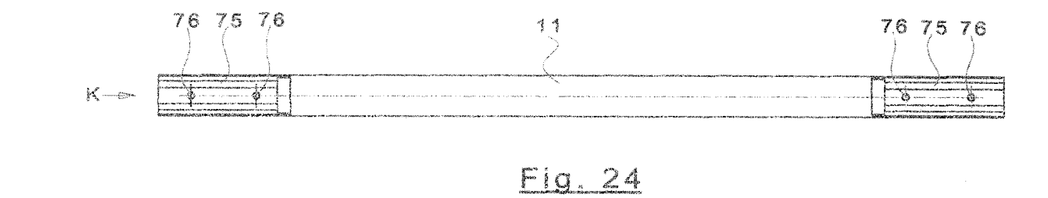
FIG. 24 is a side view of the section insulator of FIG. 23 rotated by 90°.
Figure 25:
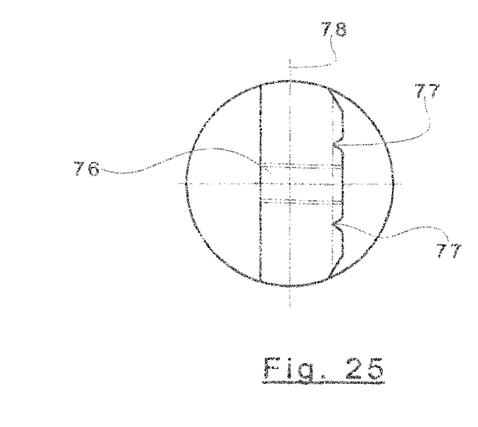
FIG. 25 is an enlarged front view of the section insulator of FIG. 24 seen in the direction of arrow K.

FIGS. 23 to 25 show the insulating rod 11 which mechanically connects the two conductor rails 1 and 2. FIG. 25 shows an enlarged view of the insulating rod 11 front seen in the direction of the arrow K. The insulating rod 11 is an elongated body with circular section (FIG. 25) which on both ends is flattened into a substantially rectangular section 75. Both flattened sections 75 each have two bores 76 for receiving the screws 12 (FIG. 3) by means of which the insulating rod 11 is fixed to both conductor rails 1 and 2. One side of the flattened section 75 comprises grooves 77 matching the projections 62 (FIG. 15) of the conductor rail. Moreover, it can be taken from FIG. 25 that the flattened section 76 is arranged eccentrically—with respect to a central axis—with the section 75 width being smaller than the distance between the two clamping arms 51 (FIG. 17) so that the flattened section 75 abuts only on one of the two clamping arms 51 and is fixed there.

Figure 26:
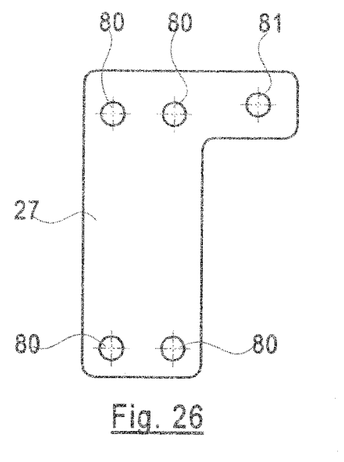
FIG. 26 is a top view of a connection plate used for the section insulator.

FIG. 26 shows the connection plates 27 and 28 to which the spark conductors 23 and 24 are attached, and the screw 36 for height adjustment of the respective conductive runner. The connection plate 27 is an L-shaped plate with six bores of which four are designated with 80 for receiving the screws 38 and 39 (FIG. 6) by means of which the connection plate is fixed to the conductor rail 1 and/or 2. The bore 81 on the short L-leg receives the adjusting screw 36 for height adjustment of the conductive runner.

Figure 28:
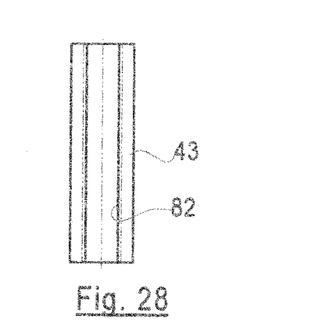
FIG. 28 is a side view of a distance sleeve used for the section insulator.
Figure 29:
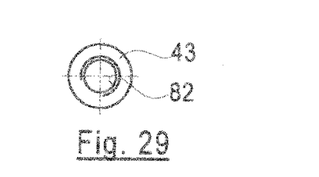
FIG. 29 is a front view of the distance sleeve of FIG. 28.

FIGS. 28 and 29 show the distance sleeve 43 in side and front view. As has already been mentioned, said sleeve serves for spreading the clamping arms 51 (FIG. 17) when inserting the contact wire 7. The distance sleeve 43 has a continuous threaded hole 82 so that screws 42 (FIG. 7) can be screwed in from both sides.

Figures 27, 30:
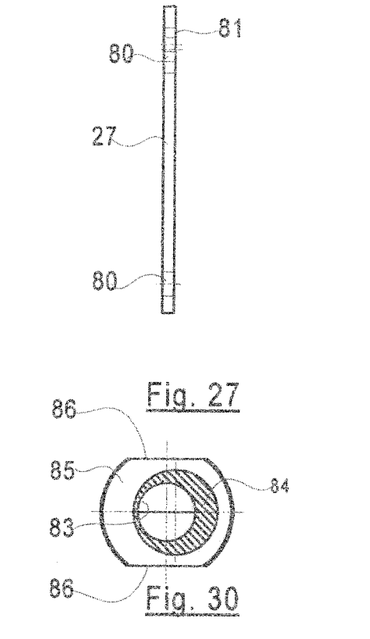
FIG. 27 is a front view of the connection plate of FIG. 26.
FIG. 30 is a sectional front view of an eccentric sleeve which is used for the section insulator.
Figure 31:
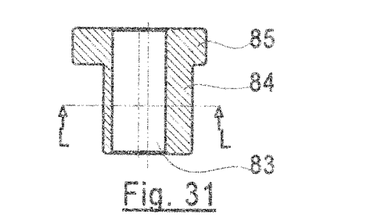
FIG. 31 is a sectional side view of the eccentric sleeve of FIG. 30.

FIGS. 30 and 31 show the eccentric sleeve, which is used for height adjustment of the conductive runners and the insulating runners, as is described, for example, in connection with the eccentric sleeves 34 and 35 (FIGS. 2 and 3) and the eccentric sleeve 46 (FIG. 9). The eccentric sleeve comprises a central hole 83 and a circular eccentric body 84 offset eccentrically to said hole, which is formed on a head 85 in one single piece, with the head 85 comprising two opposing parallel, plane surfaces 86 to which a wrench for rotating the eccentric sleeve can be applied. The central hole 83 receives the screws (FIG. 4) or the pin 45 which serve as a guide for the eccentric sleeve. FIG. 31 is a sectional side view here. FIG. 30 is a cross-section seen along line L-L of FIG. 31.

Figure 32:
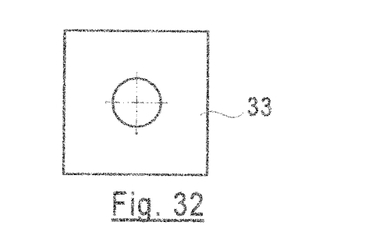
FIG. 32 is a top view of a connection plate for connecting conductive and insulating runners of the section insulator with a conductor rail.
Figure 33:
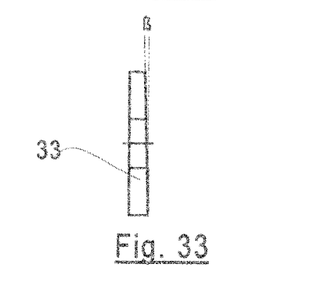
FIG. 33 is a front view of the connection plate of FIG. 32.

FIGS. 32 and 33 show the connection plates 30 and 32 (FIG. 4) which are inserted on the respective section-side end of the conductive runners and the insulating runners between the exterior side of the conductor rail and the respective runner. These connection plates are square in the top view of FIG. 32, and chamfered under an angle β in the side view of FIG. 33, with said angle being in the order of 15°. Under said angle the runners extend relative to the conductor rail so that the spreading described occurs.

In summary, thus the invention provides a mechanically very stable section insulator with a mechanically closed system, which ensures that a collector of a vehicle passing by is always in electrical contact with a runner under voltage, with all elements being adjustable such that an exact positioning is guaranteed which prevents spark formation. Due to the closed system, also mechanical vibrations, which excite the contact strips of the collector and can cause spark formation, are largely excluded.

The invention claimed is:

1. A section insulator for first and second aligned rigid conductor rails having opposing ends and a first space between the opposing ends, comprising:
    a first conductive runner for connection to the first aligned conductor rail and a second conductive runner for connection to the second aligned conductor rail, wherein the conductive runners protrude into the first space with sides of the the conductive runners in a contact plane and facing a travel plane, wherein the conductive runners overlap in a longitudinal direction of the conductor rails, and wherein the conductive runners are antiparallel to each other and separated by a distance;
    a first insulating runner connected with the first conductive runner and for connecting to the second conductor rail;
    a second insulating runner connected with the second conductive runner and for connecting to the first conductor rail;
    wherein the edges of the conductive runners and the insulating runners facing the travel plane are arranged in the contact plane;
    wherein the conductive runners and the insulating runners at their ends are height-adjustable by means of eccentric sleeves in relation to the conductor rail; and
    further comprising another eccentric sleeve for relative height adjustment is arranged on the connection between the conductive runners and the associated insulating runners.

2. The section insulator according to claim 1 wherein the conductive runners are height-adjustable by a screw arranged vertically to the contact plane, with the screw being supported on the assigned conductor rails, being threadable into a threaded hole of the conductive runners, and being arranged offset in longitudinal direction of the conductor rails.

3. The section insulator according to claim 2 wherein the first and second conductor rails are aligned towards each other along a travel line and wherein the conductive runners and the insulating runners each extend at an angle (β) to the travel line.

4. The section insulator according to claim 3 wherein the angle (β) is between 10 degrees and 20 degrees.

5. The section insulator according to claim 1 wherein the first and second conductor rails are aligned towards each other along a travel line and wherein the conductive runners and the insulating runners each extend at an angle (β) to the travel line.

6. The section insulator according to claim 5 wherein the angle (β) is between 10 degrees and 20 degrees.

7. The section insulator according to claim 5 wherein the two conductor rails are mechanically connected with each other by an insulating rod, with the insulating rod being arranged between the conductive runners and the insulating runners, and being located above the contact plane.

8. The section insulator according to claim 7 comprising contact wires on the conductor rails and the contact wires are bent out of the contact plane in a direction such that they are facing away from the travel plane.

9. The section insulator according to claim 5 comprising contact wires on the conductor rails and the contact wires are bent out of the contact plane in a direction such that they are facing away from the travel plane.

10. The section insulator according to claim 1 wherein the two conductor rails are mechanically connected with each other by an insulating rod, with the insulating rod being arranged between the conductive runners and the insulating runners, and being located above the contact plane.

11. The section insulator according to claim 1 comprising contact wires on the conductor rails and the contact wires are bent out of the contact plane in a direction such that they are facing away from the travel plane.

12. The section insulator according to claim 11 wherein the ends of the conductive runners and the insulating runners comprise ramp and/or lead roundings facing away from the contact plane.

13. The section insulator according to claim 1 wherein the ends of the conductive runners and the insulating runners comprise ramp and/or lead roundings facing away from the contact plane.

14. The section insulator according to claim 1 assembled into a rail system comprising said first and second aligned rigid conductor rails.

* * * * *